(12) United States Patent
Yun et al.

(10) Patent No.: US 8,913,954 B2
(45) Date of Patent: Dec. 16, 2014

(54) MOBILE TERMINAL AND METHOD OF TRANSMITTING INFORMATION USING THE SAME

(75) Inventors: Yeerang Yun, Seoul (KR); Choonjae Lee, Seoul (KR); Yoomee Song, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 13/612,281

(22) Filed: Sep. 12, 2012

(65) Prior Publication Data

US 2013/0065523 A1 Mar. 14, 2013

(30) Foreign Application Priority Data

Sep. 14, 2011 (KR) .................. 10-2011-0092526

(51) Int. Cl.
*H04B 5/00* (2006.01)
*H04M 1/725* (2006.01)
(52) U.S. Cl.
CPC ........ *H04M 1/7253* (2013.01); *H04M 2250/04* (2013.01)
USPC .... 455/41.1; 455/41.2; 455/414.1; 705/14.19
(58) Field of Classification Search
CPC ..... H04W 76/02; H04W 92/18; H04W 12/00; H04W 28/18; H04W 48/16
USPC ........... 455/41.1, 41.2, 414.1, 420, 88, 414.3; 705/14.19, 39, 41
See application file for complete search history.

(56) References Cited

U.S. PATENT DOCUMENTS

| | | | | |
|---|---|---|---|---|
| 5,444,848 | A * | 8/1995 | Johnson et al. ............... | 709/241 |
| 8,131,645 | B2 * | 3/2012 | Lin et al. ......................... | 705/51 |
| 8,176,194 | B2 * | 5/2012 | Saito et al. .................... | 709/231 |
| 8,190,214 | B2 * | 5/2012 | Kimura et al. ................. | 455/567 |
| 8,380,982 | B2 * | 2/2013 | Miyabayashi et al. ........ | 713/156 |
| 8,565,676 | B2 * | 10/2013 | Gormley et al. .............. | 455/41.1 |
| 8,660,897 | B2 * | 2/2014 | Abhyanker ................ | 705/14.64 |
| 2005/0141465 | A1 * | 6/2005 | Kato et al. ..................... | 370/337 |
| 2009/0209296 | A1 * | 8/2009 | Kimura et al. ................. | 455/567 |
| 2010/0082448 | A1 * | 4/2010 | Lin et al. ........................ | 705/26 |
| 2010/0221999 | A1 | 9/2010 | Braun et al. | |
| 2012/0029990 | A1 * | 2/2012 | Fisher ........................ | 705/14.19 |
| 2012/0252558 | A1 * | 10/2012 | Mishra et al. .................... | 463/25 |
| 2012/0257245 | A1 * | 10/2012 | McCoog et al. ............. | 358/1.15 |
| 2013/0052950 | A1 * | 2/2013 | Hillan et al. ................. | 455/41.1 |
| 2013/0163417 | A1 * | 6/2013 | Gupta ........................... | 370/230 |
| 2013/0303085 | A1 * | 11/2013 | Boucher et al. .............. | 455/41.1 |
| 2013/0343542 | A1 * | 12/2013 | Rosati et al. .................. | 380/270 |

OTHER PUBLICATIONS

European Search Report dated Dec. 3, 2012 for Application 12183971.6.
P. Hethmon, Hethmon Software, Extensions to FTP; Mar. 1, 2007 pp. 1-61.

* cited by examiner

*Primary Examiner* — Minh D Dao
(74) *Attorney, Agent, or Firm* — KED & Associates LLP

(57) ABSTRACT

A mobile terminal and controlling method thereof are disclosed, by which information is facilitated to be transceived between terminals. The present invention may include an NFC module configured to perform a near field communication (NFC) with an external device and a controller, if an NFC transceiving mode for performing the NFC is activated and an NFC connection with the external device occurs, determining a count of the NFC connect, the controller controlling at least one portion of information related to the NFC transceiving mode to be transmitted by stages to the external device via the NFC module in accordance with the determined count.

20 Claims, 17 Drawing Sheets

(a)

(b)

(c)

(d)

(a)

(b)

(c)

(d)

(a)

(b)

(c)

(d)

(a)

(b)

(c)

(d)

(a)

(b)

(c)

(d)

(a)          (b)

(c)          (d)

MOBILE TERMINAL AND METHOD OF TRANSMITTING INFORMATION USING THE SAME

CROSS-REFERENCE TO RELATED APPLICATION(S)

Pursuant to 35 U.S.C. §119(a), this application claims the benefit of earlier filing date and right of priority to Korean Patent Application No. 10-2011-0092526, filed on Sep. 14, 2011, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for facilitating information to be transceived between terminals.

2. Background

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a mobile terminal such as a smart phone, a smart tablet and the like is released, it tends to be equipped with various short range communication modules capable of such a short-range bidirectional communication function as a function of exchanging general informations between mobile terminals, a function of transmitting settlement information to a settlement terminal and the like. Therefore, the demands for methods of exchanging informations via the short range communication modules more conveniently are rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which information can be exchanged more conveniently via short range communications.

Another object of the present invention is to provide a mobile terminal and controlling method thereof, by which a user-desired information can be transmitted by stages in exchanging information via a short range communication.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include an NFC module configured to perform a near field communication (NFC) with an external device and a controller, if an NFC transceiving mode for performing the NFC is activated and an NFC connection with the external device occurs, determining a count of the NFC connect, the controller controlling at least one portion of information related to the NFC transceiving mode to be transmitted by stages to the external device via the NFC module in accordance with the determined count.

In another aspect of the present invention, a method of controlling a mobile terminal according to one embodiment of the present invention may include the steps of activating an NFC module configured to perform a near field communication (NFC) with an external device, detecting an NFC connection with the external device, determining whether the NFC connection is an initial connection with the external device, if the NFC connection is the initial connection as a result of the determining step, transmitting a $1^{st}$ priority information related to the NFC transceiving mode to the external device, and if the NFC connection is not the initial connection as the result of the determining step, transmitting an information corresponding to a priority next to that of a last connection previous to the NFC connection to the external device.

In another aspect of the present invention, a method of controlling a mobile terminal according to one embodiment of the present invention may include the steps of activating an NFC module configured to perform a near field communication (NFC) with an external device, detecting an initial NFC connection with the external device, transmitting a $1^{st}$ priority information related to the NFC transceiving mode to the external device, detecting a $2^{nd}$ NFC connection with the external device, and transmitting a $2^{nd}$ priority information related to the NFC transceiving mode to the external device.

In a further aspect of the present invention, a method of controlling a mobile terminal according to one embodiment of the present invention may include the steps of activating an NFC module configured to perform a near field communication (NFC) with an external device, detecting an initial NFC connection with the external device, receiving a $1^{st}$ priority information related to the NFC transceiving mode from the external device, detecting a $2^{nd}$ NFC connection with the external device; and receiving a $2^{nd}$ priority information related to the NFC transceiving mode from the external device.

Accordingly, the present invention provides the following effects and/or features.

First of all, a short range communication can be performed more conveniently via a mobile terminal according to at least one embodiment of the present invention.

Secondly, a mobile terminal according to an embodiment of the present invention transmits different information by stages in accordance with a trigger count of a short range communication, whereby a user is able to conveniently transmit or receive a desired information only by changing the trigger count only.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
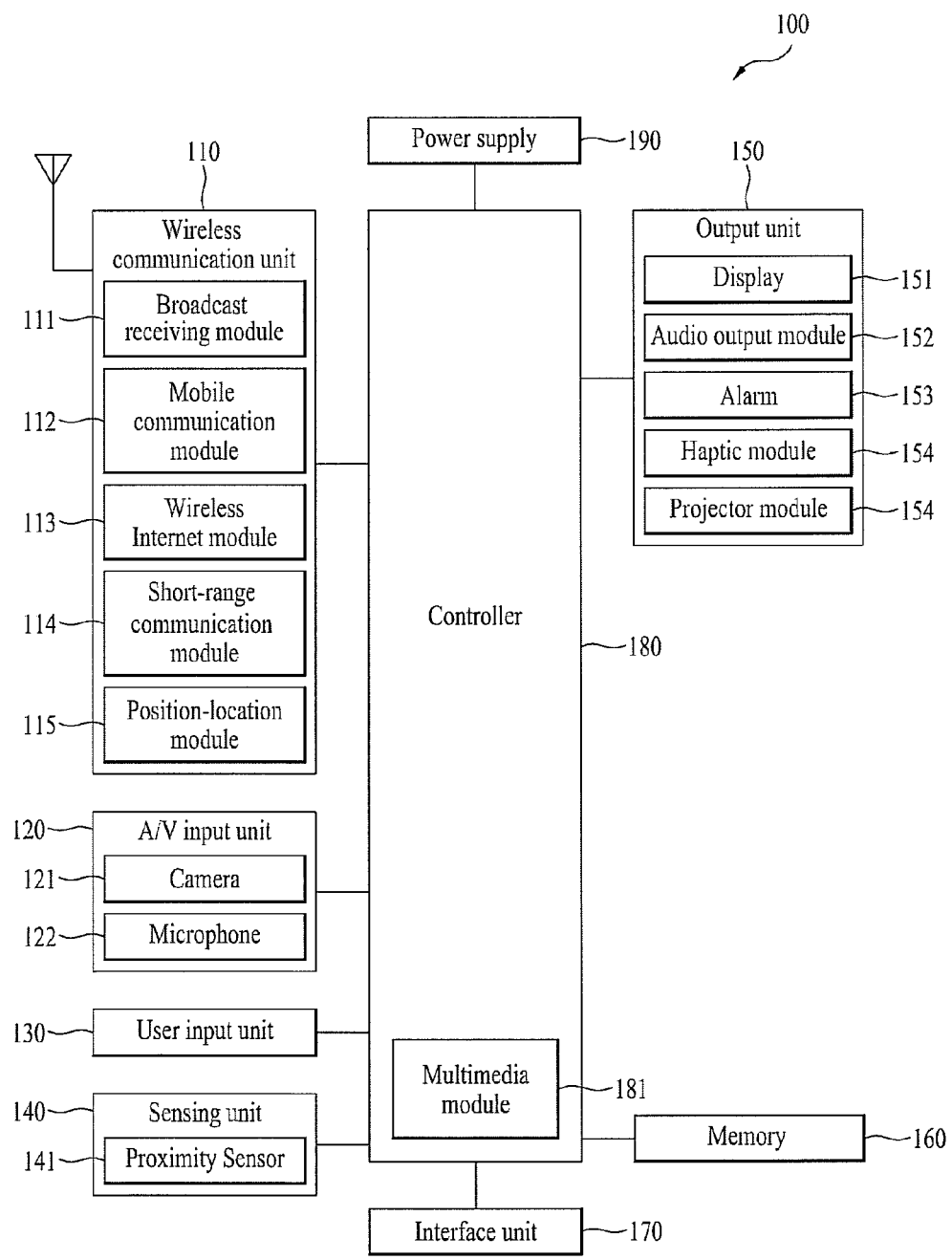
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
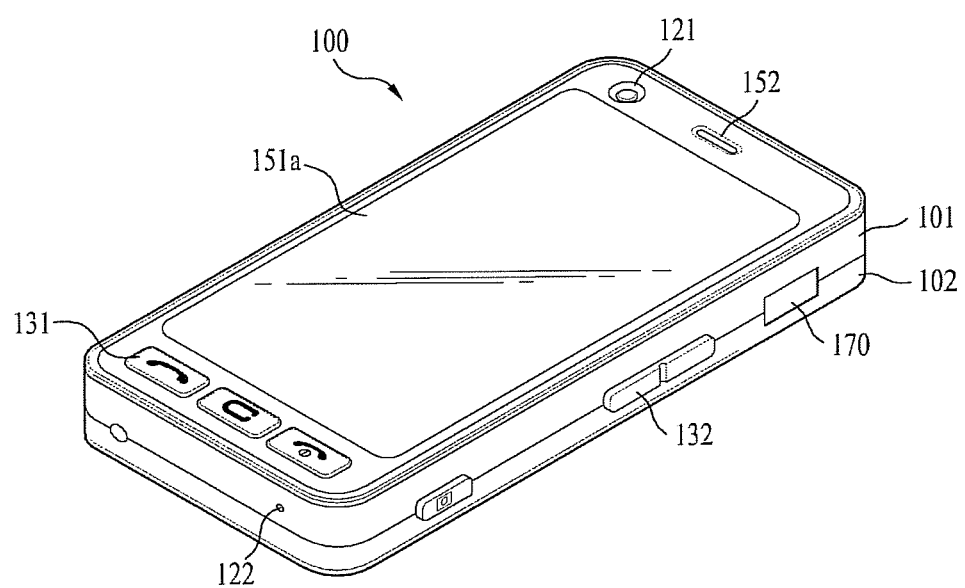
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

A mobile terminal according to the present invention mentioned in the following description includes at least one of the components described with reference to FIG. 1, by which the present invention may be non-limited. The mobile terminal according to the present invention may include components more or less than those shown in FIG. 1. For clarity and convenience, assume that the display unit 151 of the mobile terminal 100 according to the present invention may include a touchscreen and that the mobile terminal 100 may include the short range communication module 114 to perform short range communications.

For example of a communication system via the short range communication module 114, there is a near field communication (hereinafter abbreviated NFC). In particular, the NFC is a short range communication specification using magnetic field induction between devices standing near to each other. And, related standards may include Ecma 340, ISO/IEC 18092 and the like. This communication system may be regarded as a sort of RFID (radio frequency identification). The NFC uses a frequency on 13.56 MHz band similar to that of a smart card. Yet, the NFC differs from the smart card, which supports a unidirectional communication only, in supporting bidirectional communications. In particular, unlike the smart card playing a role as a tag for saving and transmitting specific information to a reader only, the NFC plays a role as a tag and also plays a role as a reader/writer for reading/writing information of the tag. In case that NFC is provided to each of terminals on both sides, it may be usable for P2P (point to point) information exchange. This technology may be able to implement a security level relatively higher than that of Bluetooth and is advantageous in providing a quick connection. Although the NFC has a communication distance (e.g., maximum 10 cm to 20 cm) shorter than that of Bluetooth, it may be advantageous in that confusion is reduced in a complicated space. Moreover, if terminals stand in near distance without separate user recognition between the terminals, it may be possible to establish a communication. And, the NFC has a relatively short communication time, which is advantageous for security.

In the following description, assume that a short range information exchange is performed by NFC and that the mobile terminal 100 includes an NFC module for performing an NFC function as one of the short range communication modules 114. In this case, assume that an NFC module receives specific information from an external device having a different NFC module situated within a short range under the control of the controller 180 and that the NFC module is able to transmit specific information to the external device under the control of the controller 180. In particular, assume that the NFC module is activated (i.e., the NFC module performs an information transceiving operation) in a specific mode of supporting data transmission by NFC if standing near to the different NFC module of the external device within a predetermined distance. In this specification, if the NFC module of the mobile terminal and the different NFC module of the external device approach each other within a predetermined distance to activate the NFC module of the mobile terminal, it shall be named 'NFC contact'. Moreover, the external device having the different NFC module shall be named 'external NFC device' for clarity.

Step-by-step Information Transmission

According to one embodiment of the present invention, each time an NFC contact occurs, different informations are transmitted by stages or the same information is cumulatively transmitted.

Figure 3:
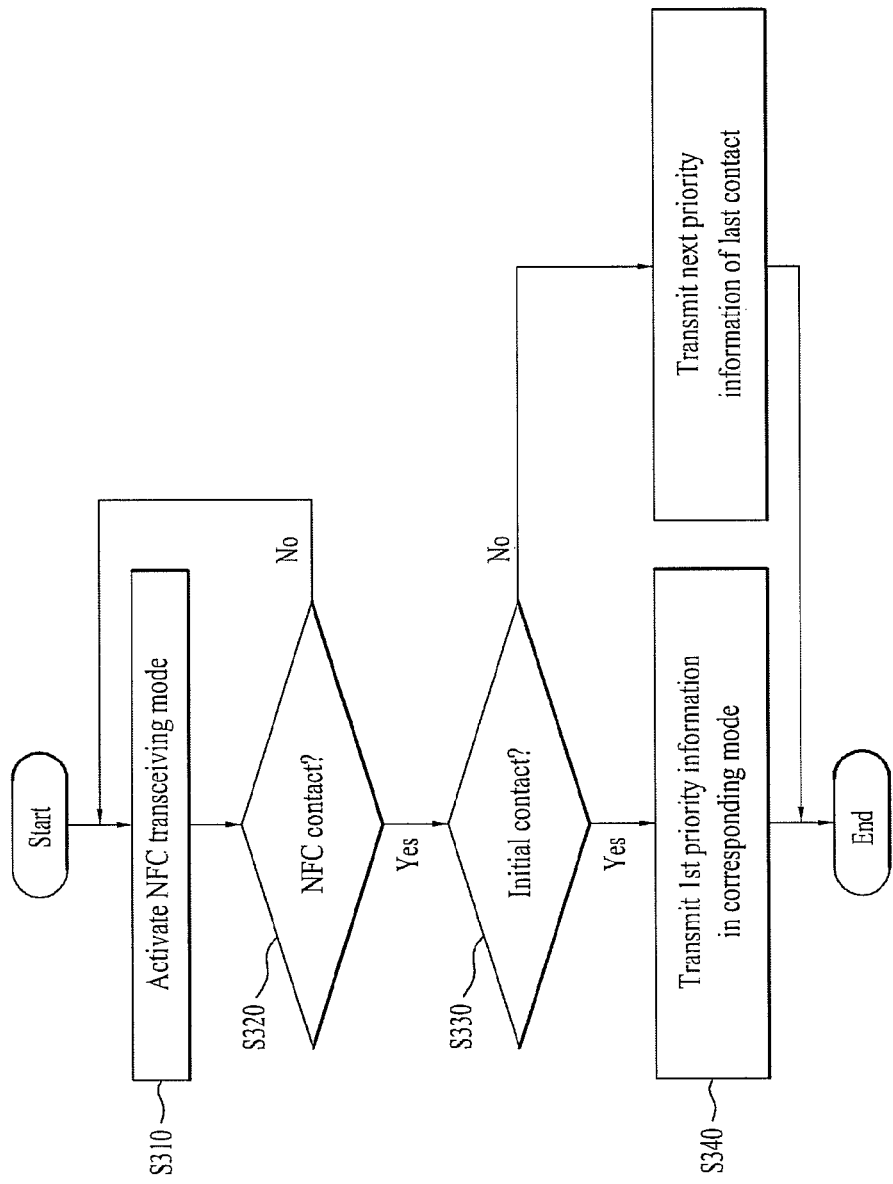
FIG. 3 is a flowchart for one example of a procedure of performing a step-by-step information transceiving method via an NFC module in a mobile terminal according to one embodiment of the present invention.

FIG. 3 is a flowchart for one example of a procedure of performing a step-by-step information transceiving method via an NFC module in a mobile terminal according to one embodiment of the present invention.

Referring to FIG. 3, first of all, an NFC transceiving mode is activated [S310]. If the NFC transceiving mode is activated, it may mean that a preparation for transceiving data is completed in case of a presence of an NFC contact in accordance with an activation of an operating system (OS) or application for supporting a data transceiving function via an NFC module. In doing so, it may be preferable that a type or quantity of information transmitted in accordance with a count of NFC contact(s) has been determined in advance. And, it may be also preferable that an application related to an activated NFC mode in a mobile terminal has been activated or is ready to be activated in an external NFC device.

Subsequently, if the controller 180 detects an occurrence of the NFC contact with the external NFC device via the NFC module [S320], the controller 180 determines whether the corresponding NFC contact is an initial contact with the external NFC device [S330].

In doing so, references for determining the initial contact may include a presence or non-presence of identity of the external NFC device, a type of the activated NFC transceiving mode, an elapse time from a previous NFC contact and the like. For instance, despite a presence of a different NFC contact after the activation of the NFC transceiving mode, if the different NFC contact is performed on a different external NFC device, the different NFC contact may be regarded as an initial contact with the corresponding external NFC device. For another instance, despite a presence of an NFC contact with a same external NFC device via a phonebook application, if there is a new NFC contact via a photo viewer application, the corresponding NFC contact may become an initial contact. For further instance, despite that the same external NFC device and the same NFC transceiving mode activated application, if a different NFC contact occurs after predetermined duration since a previous NFC contact, the corresponding NFC contact may become an initial contact. The above-mentioned references for the determination of the initial contact may be independently applicable. Alternatively, at least two of the above-mentioned references for the determination of the initial contact may be simultaneously applicable.

If the controller 180 determines that the corresponding NFC contact is the initial contact, the controller 180 may control the NFC module to transmit an information set as a $1^{st}$ priority in the currently active NFC transceiving mode to the external NFC device [S340].

On the contrary, if the controller 180 determines the corresponding NFC contact is not the initial contact, the controller 180 may control the NFC module to transmit an information set as a priority next to that of a last contact in the currently active NFC transceiving mode to the external NFC device [S350]. For instance, if the last contact is an initial contact, the controller 180 recognizes a current NFC contact as a $2^{nd}$ contact and then controls the NFC module to transmit an information set as a $2^{nd}$ priority to the external NFC device. For another instance, if the last contact is a $3^{rd}$ contact, the controller 180 recognizes a current NFC contact as a $4^{th}$ contact and then controls the NFC module to transmit an information set as a $4^{th}$ priority to the external NFC device.

In the following description, each time an NFC contact occurs via one of various applications, a process for transceiving information by stages in a mobile terminal according to one embodiment of the present invention is explained in detail.

Figure 4:
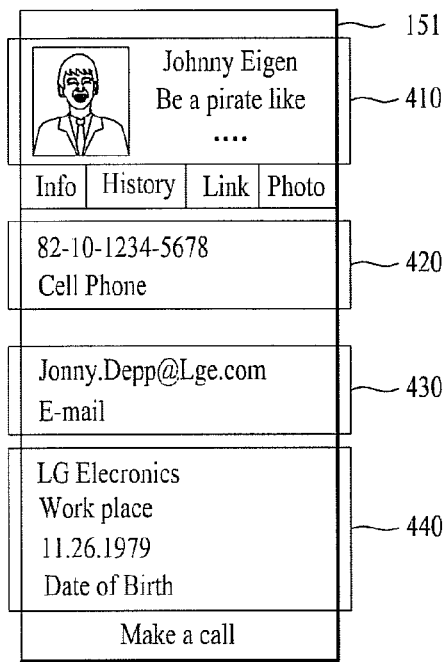
FIG. 4 is a diagram for one example of a process for transmitting information of a phonebook via NFC contact by stages in a mobile terminal according to one embodiment of the present invention.
Figure 4:
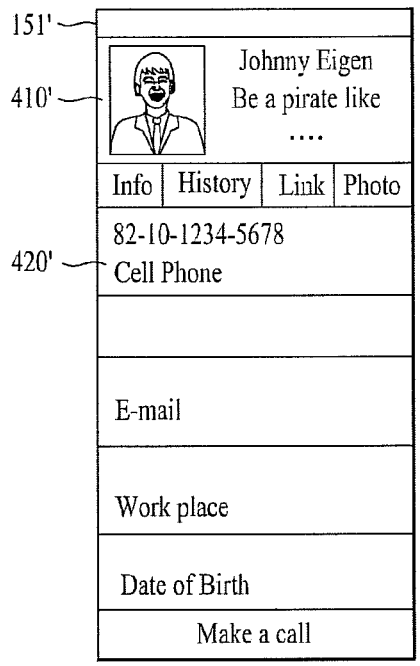
Figure 4:
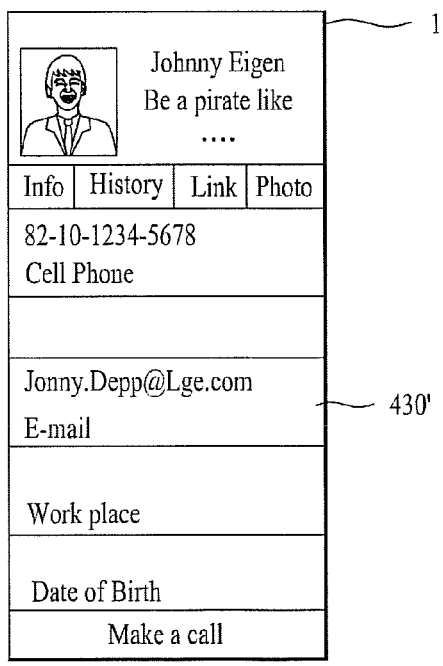
Figure 4:
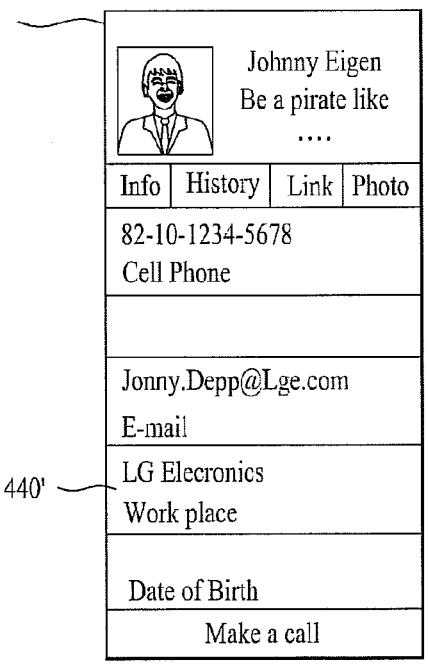

FIG. 4 is a diagram for one example of a process for transmitting information of a phonebook via NFC contact by stages in a mobile terminal according to one embodiment of the present invention.

In FIG. 4, assume a case that an NFC transceiving mode is activated via a phonebook (or an address book) application.

Referring to FIG. 4 (a), information related to a contact of one person saved in a phonebook is displayed on the display unit 151 of the mobile terminal 100. In particular, a name and photo are displayed on a top end and a phone number 420, an email address 430 and a work place and birthday information 440 are displayed in turn below the name and photo 410. In doing so, assume that a $1^{st}$ priority information is set to the name, the photo and the phone number, that a $2^{nd}$ priority information is set to the email, and that a $3^{rd}$ priority information is set to the work place and birthday information, in advance.

In doing so, if an NFC contact with an external NFC device initially occurs, referring to FIG. 4 (b), the $1^{st}$ priority information including the information on the name and photo 410' and the phone number 420' is received by the external NFC device from the mobile terminal 100 and is then displayed on a display unit 151' of the external NFC device.

If a $2^{nd}$ contact occurs, referring to FIG. 4 (c), the $2^{nd}$ information including the information on the email 430' is received by the external NFC device from the mobile terminal 100 and is then displayed on the display unit 151' of the external NFC device.

If a $3^{rd}$ contact occurs, referring to FIG. 4 (d), the $3^{rd}$ information including the work place and birthday information 440' is received by the external NFC device from the mobile terminal 100 and is then displayed on the display unit 151' of the external NFC device.

Figure 5:
FIG. 5 is a diagram for one example of a process for transmitting image information via NFC contact by stages in a mobile terminal according to one embodiment of the present invention.
Figure 5:
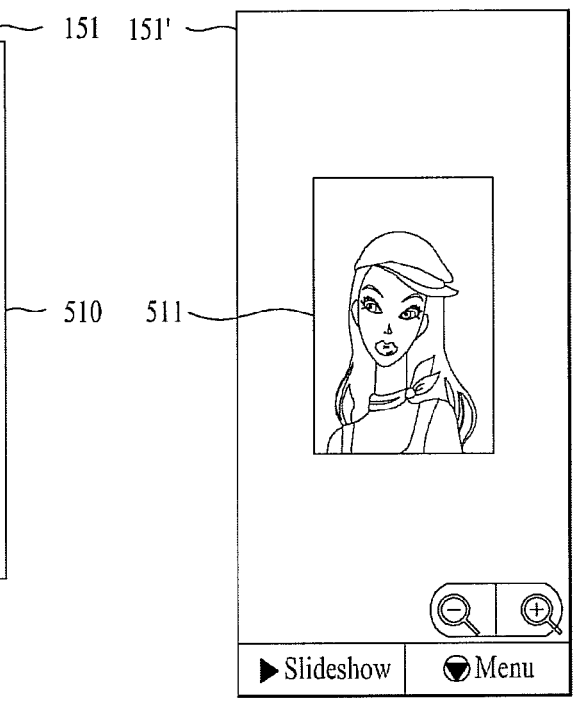
Figure 5:
Figure 5:
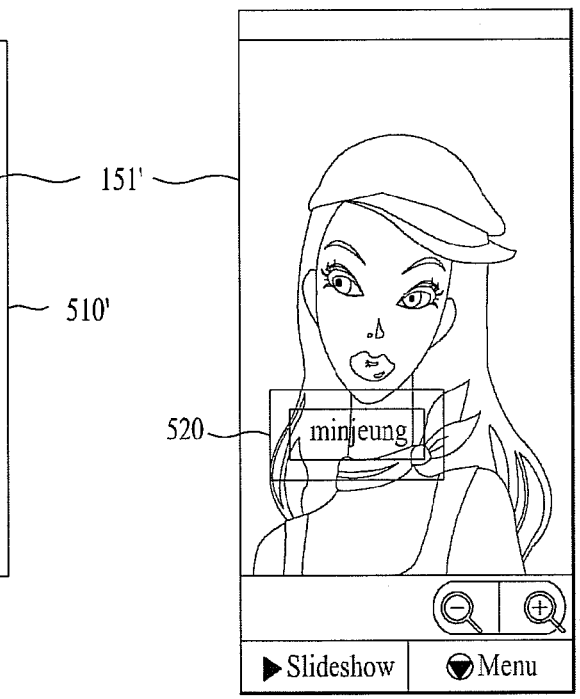

FIG. 5 is a diagram for one example of a process for transmitting image information via NFC contact by stages in a mobile terminal according to one embodiment of the present invention.

In FIG. 5, assume a case that an NFC transceiving mode is activated via an image viewer application.

Referring to FIG. 5 (a), an image viewer application is activated and a specific image file 510 is then displayed on the display unit 151 of the mobile terminal 100. In doing so, assume that a $1^{st}$ priority information is set to a thumbnail of the corresponding image file, that a $2^{nd}$ priority information is set to an original copy of the corresponding image file, and that a $3^{rd}$ priority information is set to a tag information of the corresponding image file, in advance. In this case, the tag information conceptionally includes a text information inputted for the corresponding image file by a user of the mobile terminal 100, an image file header information, a meta information and the like.

In doing so, if an NFC contact with an external NFC device initially occurs, referring to FIG. 5 (b), the $1^{st}$ priority information including the information on the thumbnail 511 of the image is received by the external NFC device from the mobile terminal 100 and is then displayed on a display unit 151' of the external NFC device.

If a $2^{nd}$ contact occurs, referring to FIG. 5 (c), the $2^{nd}$ information including the information on the original image file 510' is received by the external NFC device from the mobile terminal 100 and is then displayed on the display unit 151' of the external NFC device.

If a $3^{rd}$ contact occurs, referring to FIG. 5 (d), the $3^{rd}$ information including the tag information 520' is received by the external NFC device from the mobile terminal 100 and is then displayed on the display unit 151' of the external NFC device.

Figure 6:
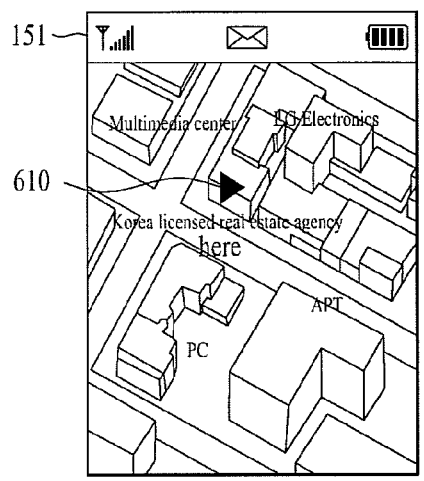
FIG. 6 is a diagram for one example of a process for transmitting location information via NFC contact by stages in a mobile terminal according to one embodiment of the present invention.
Figure 6:
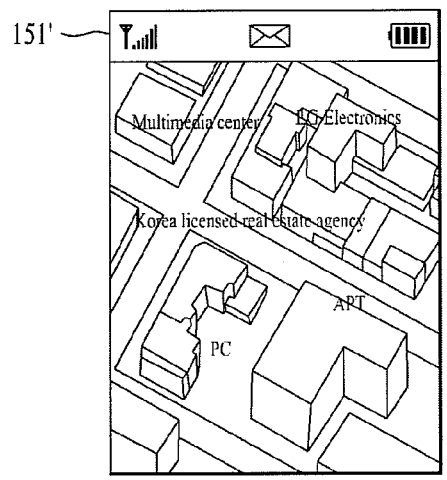
Figure 6:
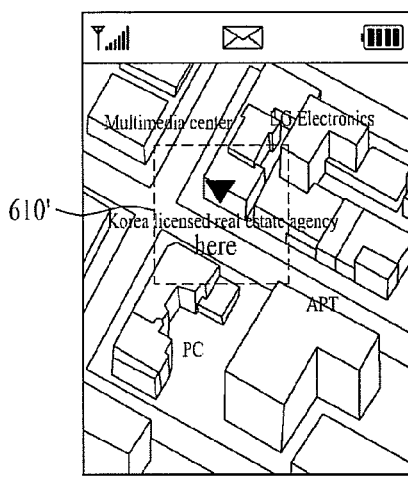
Figure 6:
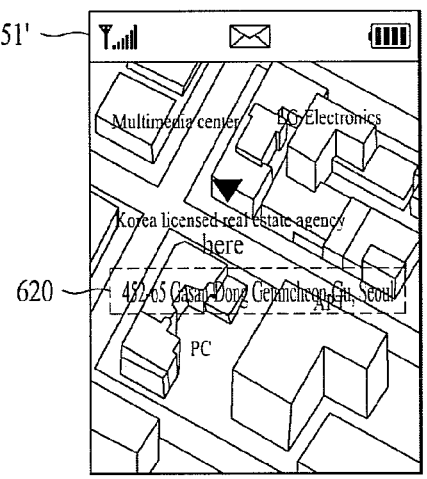

FIG. 6 is a diagram for one example of a process for transmitting location information via NFC contact by stages in a mobile terminal according to one embodiment of the present invention.

In FIG. 6, assume a case that an NFC transceiving mode is activated via a map application.

Referring to FIG. 6 (a), a map application (or a navigation application) is activated and a map image including a current location and an indicator 610 indicating the current location are then displayed on the display unit 151 of the mobile terminal 100. In doing so, assume that a $1^{st}$ priority information is set to a map information including the current location, that a $2^{nd}$ priority information is set to an accurate current location information, and that a $3^{rd}$ priority information is set to an address information corresponding to the current location, in advance.

In doing so, if an NFC contact with an external NFC device initially occurs, referring to FIG. 6 (b), the $1^{st}$ priority information including the map information is received by the external NFC device from the mobile terminal 100 and is then displayed on a display unit 151' of the external NFC device.

If a $2^{nd}$ contact occurs, referring to FIG. 6 (c), the $2^{nd}$ information including the accurate current location information is received by the external NFC device from the mobile terminal 100 and is then displayed on the display unit 151' of the external NFC device via an indicator 610'.

If a $3^{rd}$ contact occurs, referring to FIG. 6 (d), the $3^{rd}$ information including the address information 620 is additionally received by the external NFC device from the mobile terminal 100 and is then displayed on the display unit 151' of the external NFC device.

Figure 7:
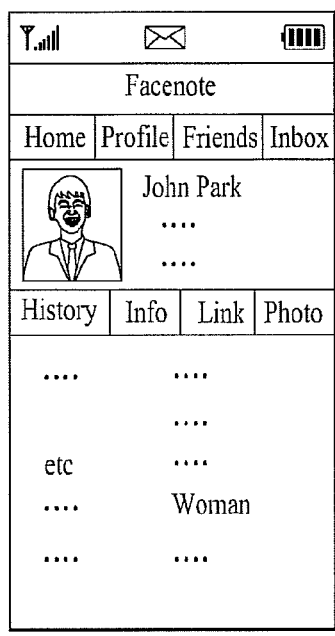
FIG. 7 is a diagram for one example of a process for transmitting login information via NFC contact by stages in a mobile terminal according to one embodiment of the present invention.
Figure 7:
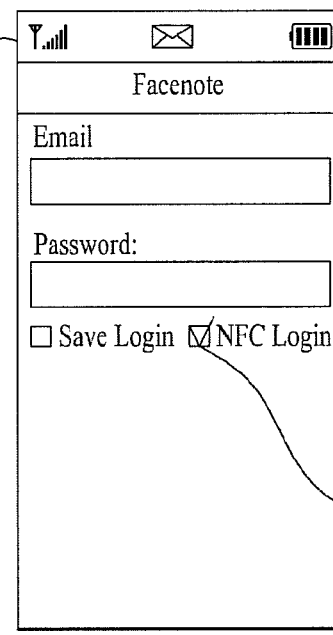
Figure 7:
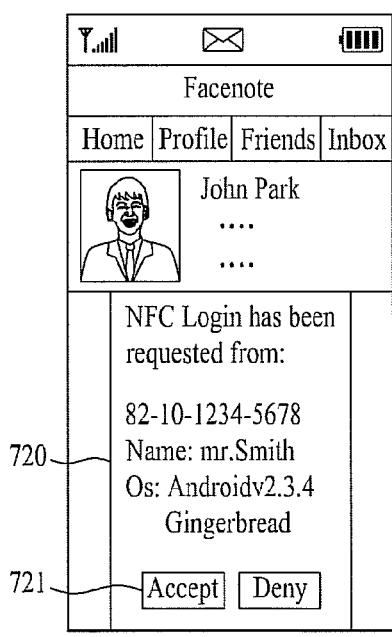
Figure 7:
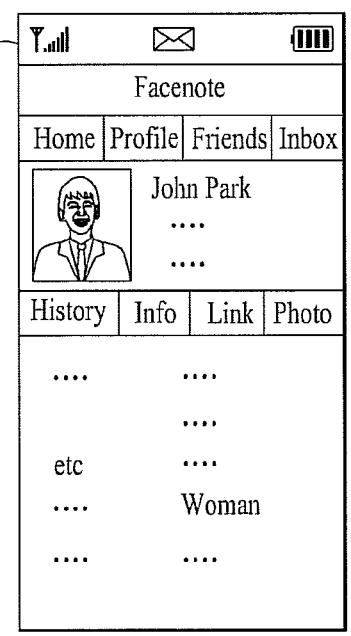

FIG. 7 is a diagram for one example of a process for transmitting login information via NFC contact by stages in a mobile terminal according to one embodiment of the present invention.

In FIG. 7, assume a case that an NFC transceiving mode is activated via a social network service (hereinafter abbreviated SNS) application.

Referring to FIG. 7 (a), an SNS application is activated, a login is performed, and a default screen is then displayed on the display unit 151 of the mobile terminal 100.

In doing so, referring to FIG. 7 (b), the SNS application is activated in an external NFC device and a login screen is then displayed on a display unit 151' of the external NFC device as well. In particular, if an NFC login option 710 is selected from the login screen, an NFC transceiving mode is activated in the external NFC device as well.

If an NFC contact between the mobile terminal 100 and the external NFC device initially occurs, referring to FIG. 7 (c), a popup window 720 indicating a device information of the external NFC device and a request for NFC login is displayed on the display unit 151 of the mobile terminal 100. If a user of the mobile terminal 100 selects an accept button 721, referring to FIG. 7 (d), a login information is transmitted from the mobile terminal 100 to the external NFC device and an initial screen, which is the same as login at an account of the user of the mobile terminal 100, is then displayed on a display unit 151' of the external NFC device.

If a $2^{nd}$ NFC contact occurs, the login information may be saved in the external NFC device for preset duration. If a $3^{rd}$ NFC contact occurs, the login information may be permanently saved in the external NFC device.

Figure 8:
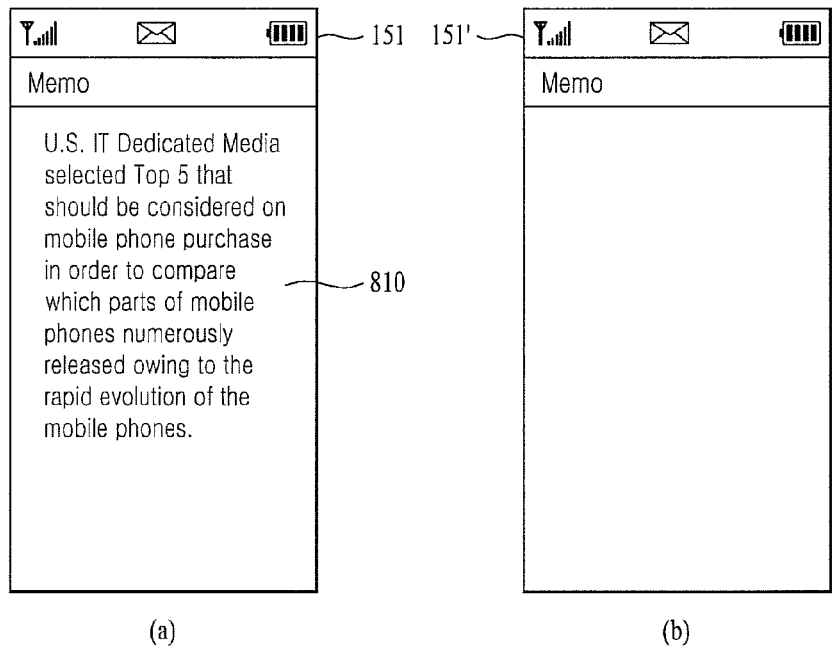
FIG. 8 is a diagram for one example of a process for transmitting text information via NFC contact by stages in a mobile terminal according to one embodiment of the present invention.
Figure 8:
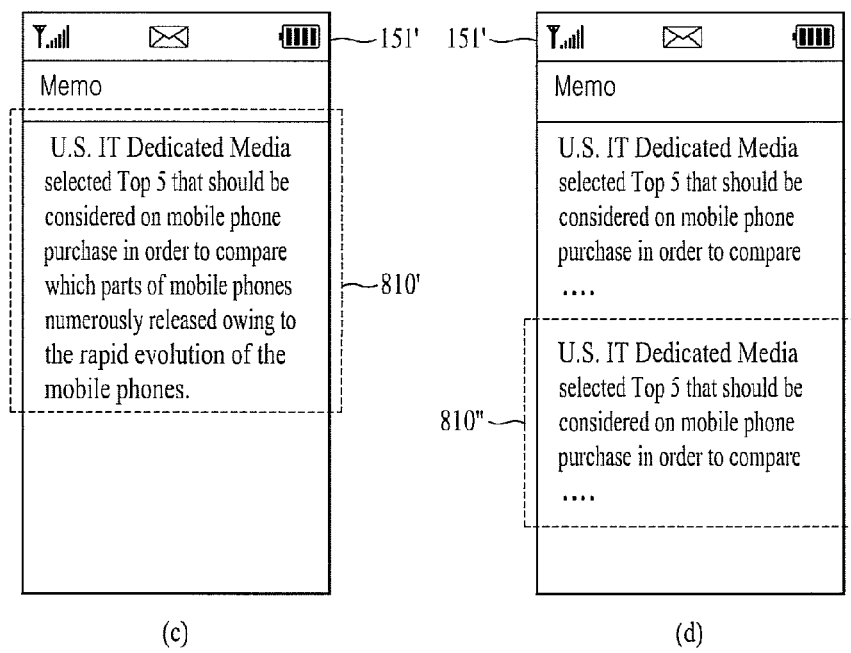

FIG. 8 is a diagram for one example of a process for transmitting text information via NFC contact by stages in a mobile terminal according to one embodiment of the present invention.

In FIG. 8, assume a case that an NFC transceiving mode is activated via a notepad application.

Referring to FIG. 8 (a), a notepad application is activated and a text 810 inputted by a user is then displayed on the display unit 151 of the mobile terminal 100.

In doing so, referring to FIG. 8 (b), the notepad application is activated in an external NFC device, a default screen, to which any text is not inputted, is then displayed on a display unit 151' of the external NFC device, and an NFC transceiving mode is activated as well.

In an NFC contact between the mobile terminal 100 and the external NFC device initially occurs, referring to FIG. 8 (c), information of the text 810 displayed on the display unit 151 of the mobile terminal 100 is transmitted to the external NFC device and the corresponding text 810' is then displayed on the display unit 151' of the external NFC device. If a $2^{nd}$ NFC contact occurs, referring to FIG. 8 (d), the corresponding text 810 is transmitted to the external NFC device once more so that the corresponding text 810" is additionally displayed on the display unit 151' of the external NFC device.

Figure 9:
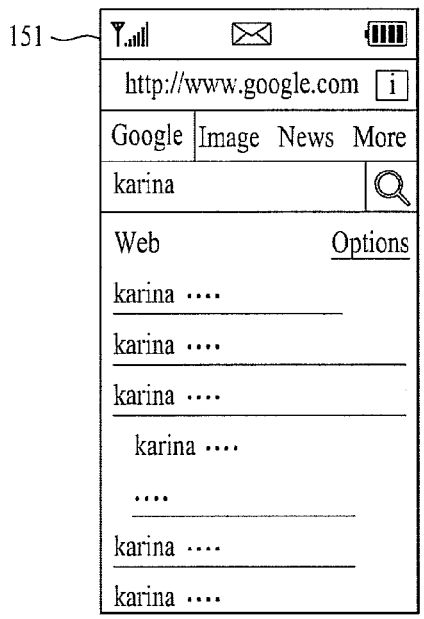
FIG. 9 is a diagram for one example of a process for transmitting application information via NFC contact by stages in a mobile terminal according to one embodiment of the present invention.
Figure 9:
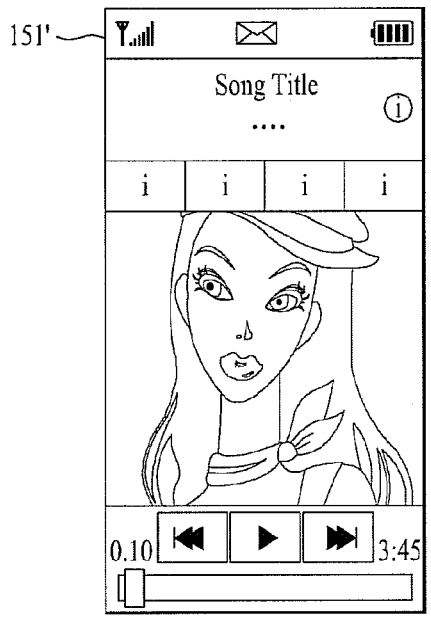
Figure 9:
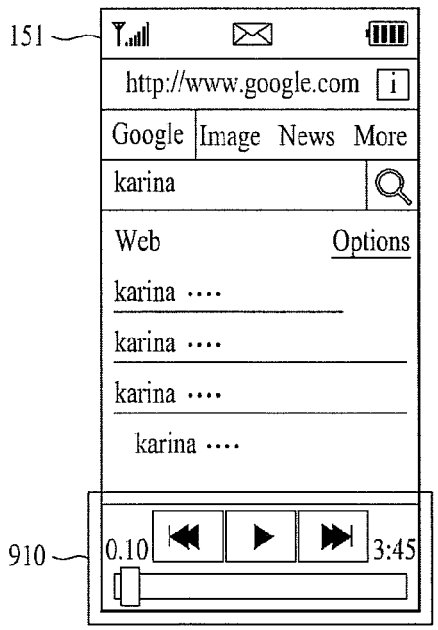
Figure 9:
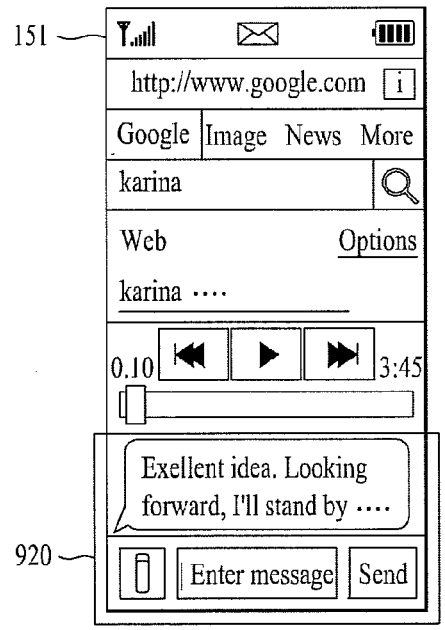

FIG. 9 is a diagram for one example of a process for transmitting application information via NFC contact by stages in a mobile terminal according to one embodiment of the present invention.

In FIG. 9, the following assumption is made. First of all, information on an application currently active in an external NFC device is transmitted to the mobile terminal 100 each time an NFC contact occurs, whereby the corresponding application is activated and displayed as a split view in the mobile terminal 100.

Referring to FIG. 9 (a), a web browser application is activated and displayed on the display unit 151 of the mobile terminal 100. In doing so, an NFC transceiving mode is activated to enable a reception of application information from an external NFC device.

While a music play application is active on a display unit 151' of the external NFC device, as shown in FIG. 9 (b), if an NFC contact occurs, the music play application 910 is activated and displayed as a split view on a lower end of a screen of the display unit 151 of the mobile terminal 100, as shown in FIG. 9 (c). While a message application is active in the external NFC device, if a $2^{nd}$ NFC contact occurs, the screen is split one more time and the message application 920 is activated and displayed on the lower end of the display unit 151 of the mobile terminal 100, as shown in FIG. 9 (d).

Figure 10:
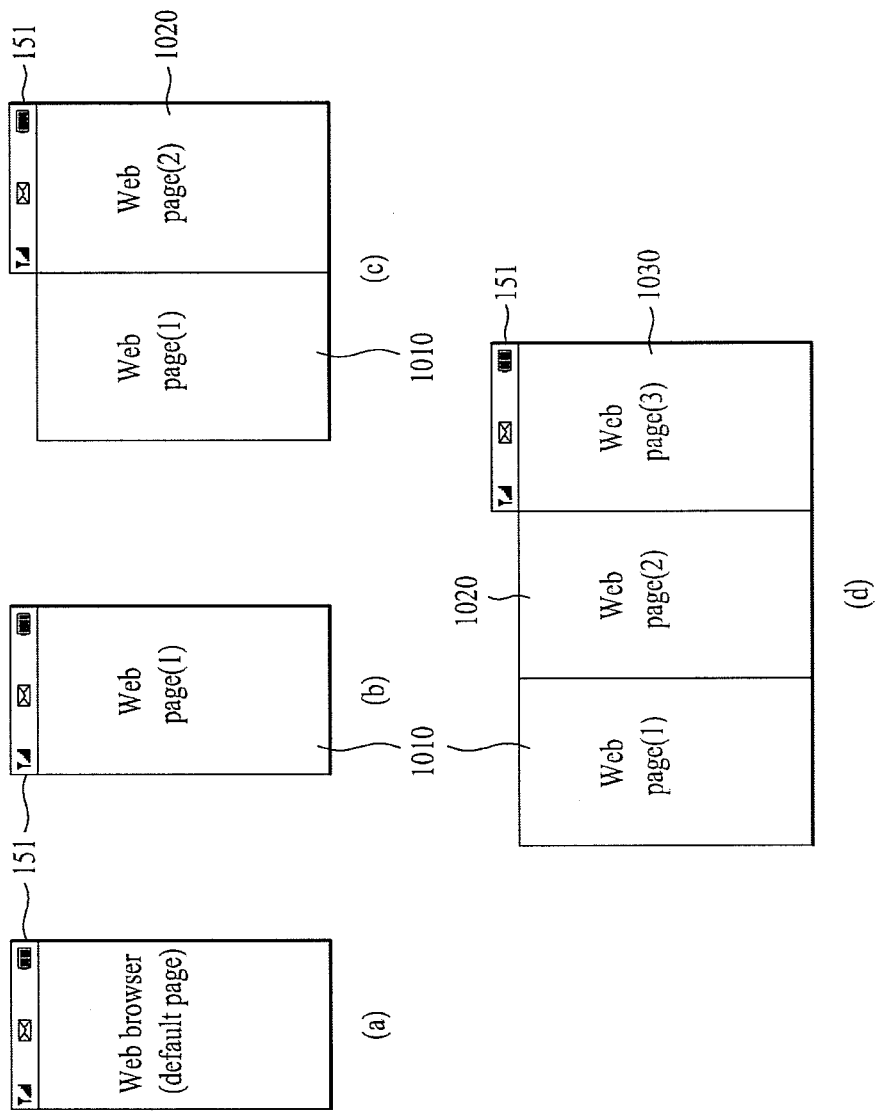
FIG. 10 is a diagram for one example of a process for transmitting webpage information via NFC contact by stages in a mobile terminal according to one embodiment of the present invention.

FIG. 10 is a diagram for one example of a process for transmitting webpage information via NFC contact by stages in a mobile terminal according to one embodiment of the present invention.

In FIG. 10, the following assumption is made. First of all, while web browsers are active in an external NFC device and the mobile terminal 100 both, if information on a webpage currently displayed in the external NFC device is transmitted to the mobile terminal 100 each time an NFC contact occurs, whereby the corresponding webpage is displayed as a new window.

Referring to FIG. 10 (a), a web browser application is activated and a default webpage is then displayed on the display unit 151 of the mobile terminal 100. In doing so, an NFC transceiving mode is activated to enable a reception of a webpage information from an external NFC device.

When a $1^{st}$ webpage is displayed in the external NFC device, if an initial NFC contact occurs, an information on the $1^{st}$ webpage is transmitted to the mobile terminal 100 from the external NFC device and the $1^{st}$ webpage may be then displayed on the display unit 151 of the mobile terminal 100, as shown in FIG. 10 (b).

Thereafter, when a $2^{nd}$ webpage is displayed in the external NFC device, an information on the $2^{nd}$ webpage is transmitted to the mobile terminal 100 from the external NFC device. Hence, referring to FIG. 10 (c), the $2^{nd}$ webpage 1020 may be displayed on a new window. Alternatively, the $2^{nd}$ webpage 1020 may be displayed on a new tab if the web browser provides a tab function. In dong so, if the $2^{nd}$ webpage 1020 is opened as the new window, the $1^{st}$ webpage 1010 may remain intact on the previous window. If the $2^{nd}$ webpage 1020 is opened on the new tab, the $1^{st}$ webpage 101 may remain on the previous tab. In particular, although the $2^{nd}$ webpage 1020 looks as if displayed on the display unit 151 only [FIG. 10 (c)], the $1^{st}$ webpage 101 actually remains on another tab or window, if a window/tab switching command (e.g., a flicking touch inputted in right direction, a drag touch inputted in right direction, etc.) is inputted, the $1^{st}$ webpage 101 may be directly displayed 1010.

Similarly, when a $3^{rd}$ webpage is displayed in the external NFC device under the circumstance shown in FIG. 10 (c), if a $3^{rd}$ NFC contact occurs, an information on the $3^{rd}$ webpage may be transmitted to the mobile terminal 100 from the external NEC device. Hence, the $3^{rd}$ webpage 1030 may be displayed as a new window or a new tab on the display unit 151 of the mobile terminal 100 [FIG. 10 (d)]. Of course, if the $3^{rd}$ webpage 1030 is opened as the new window, the $1^{st}$ webpage 1010 and the $2^{nd}$ webpage 1020 may remain on the previous windows, respectively. If the $3^{rd}$ webpage is opened on the new tab, the $1^{st}$ webpage 101 and the $2^{nd}$ webpage may remain intact on the previous tables, respectively.

In FIG. 10, a new webpage is set to be displayed via a new window or a new tab. Alternatively, a new webpage may be displayed as a split view. For instance, referring to FIG. 10 (b), at least one portion of the $1^{st}$ page 1010 is displayed next to the 2nd page 1020 (particularly, next to a left, right, top or bottom side of the $2^{nd}$ webpage 1020) on the display unit 151 together with the $2^{nd}$ page 1020.

Meanwhile, although FIG. 10 shows the embodiment of transmitting a current webpage information of the external NFC device, an information on a history (i.e., a previous webpage) prior to a current webpage may be transmitted. This is described with reference to FIG. 11 as follows.

Figure 11:
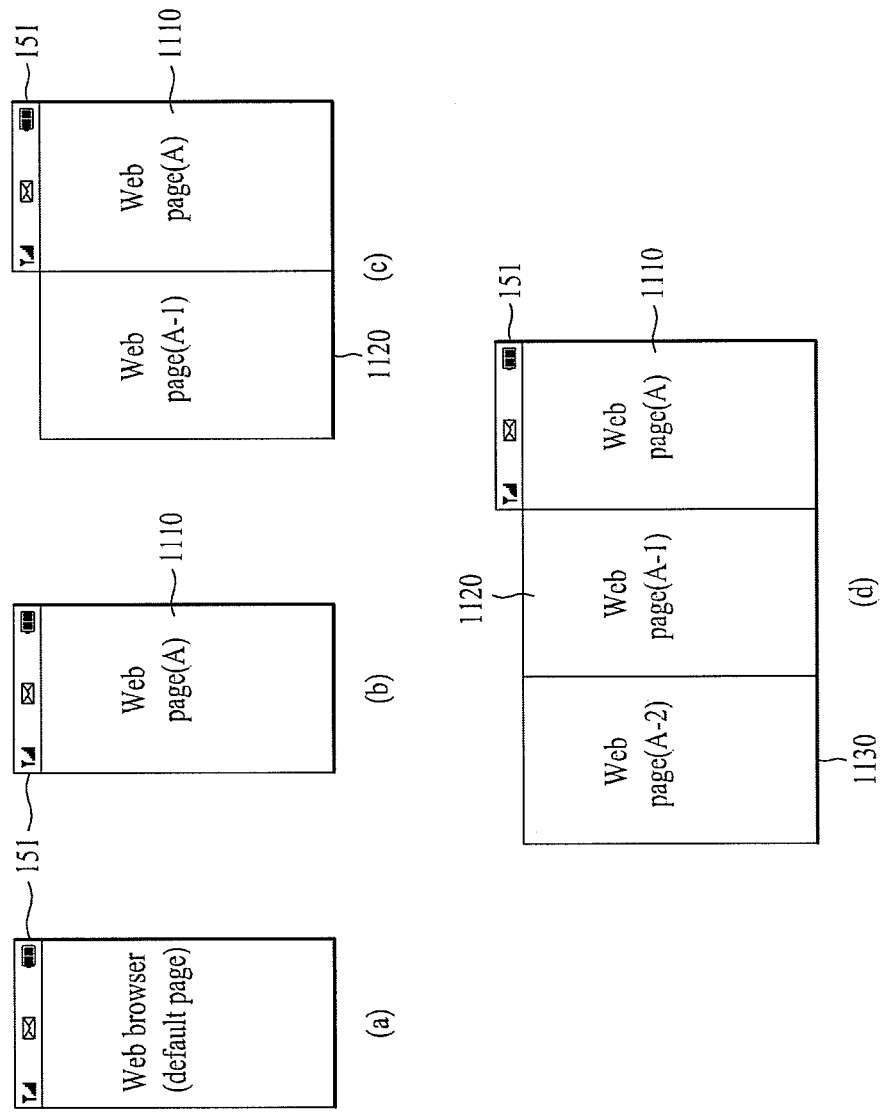
FIG. 11 is a diagram for one example of a process for transmitting webpage history information via NFC contact by stages in a mobile terminal according to one embodiment of the present invention.

FIG. 11 is a diagram for one example of a process for transmitting webpage history information via NFC contact by stages in a mobile terminal according to one embodiment of the present invention.

In FIG. 11, the following assumption is made. First of all, while web browsers are active in both of the external NFC device and the mobile terminal 100, a history information of a webpage currently displayed in the external NFC device is transmitted to the mobile terminal 100 each time an NFC contact occurs, whereby the corresponding webpage is displayed as a new window or a new tab. Moreover, assume a situation in which a webpage A is currently displayed in the external NFC device in accordance with a webpage shift in order of webpage A-2→webpage A-1→webpage A.

Referring to FIG. 11 (a), a web browser application is activated and a default webpage is then displayed on the display unit 151 of the mobile terminal 100. In doing so, an NFC transceiving mode is activated to enable a reception of a webpage history information from an external NFC device.

When a webpage A is displayed in the external NFC device, if an initial NFC contact occurs, an information on the webpage A is transmitted to the mobile terminal 100 from the external NFC device and the webpage A 1110 may be then displayed on the display unit 151 of the mobile terminal 100, as shown in FIG. 11 (b).

Subsequently, if a $2^{nd}$ NFC contact occurs, an information on a webpage A-1 displayed prior to the webpage A is transmitted to the mobile terminal from the external NFC device. Hence, referring to FIG. 11 (c), the webpage A-2 1120 may be displayed on a new window. Alternatively, the webpage A-2 1020 may be added to a new tab if the web browser provides a tab function. In dong so, a currently displayed webpage is not changed. In particular, the webpage A-1 may not be displayed until a user inputs a command for changing a tab or window. Of course, in order to indicate that a new window or tab is open in accordance with a reception of a previous webpage information, a split view may be performed. For instance, referring to FIG. 119B), at least one portion of the webpage A-1 1120 may be displayed next to the webpage A 1110 (particularly, next to a left, right, top or bottom side of the webpage A 1110) together with the webpage A 1110.

Similarly, under the circumstance shown in FIG. 11 (c), if a $3^{rd}$ NFC contact occurs, an information on the webpage A-2, which is a webpage visited prior to the webpage A-1, may be transmitted to the mobile terminal 100 from the external NFC device. Hence, referring to FIG. 11 (d), the webpage A-2 1130 may be added as a new window or a new tab in the display unit 151 of the mobile terminal 100.

Figure 12:
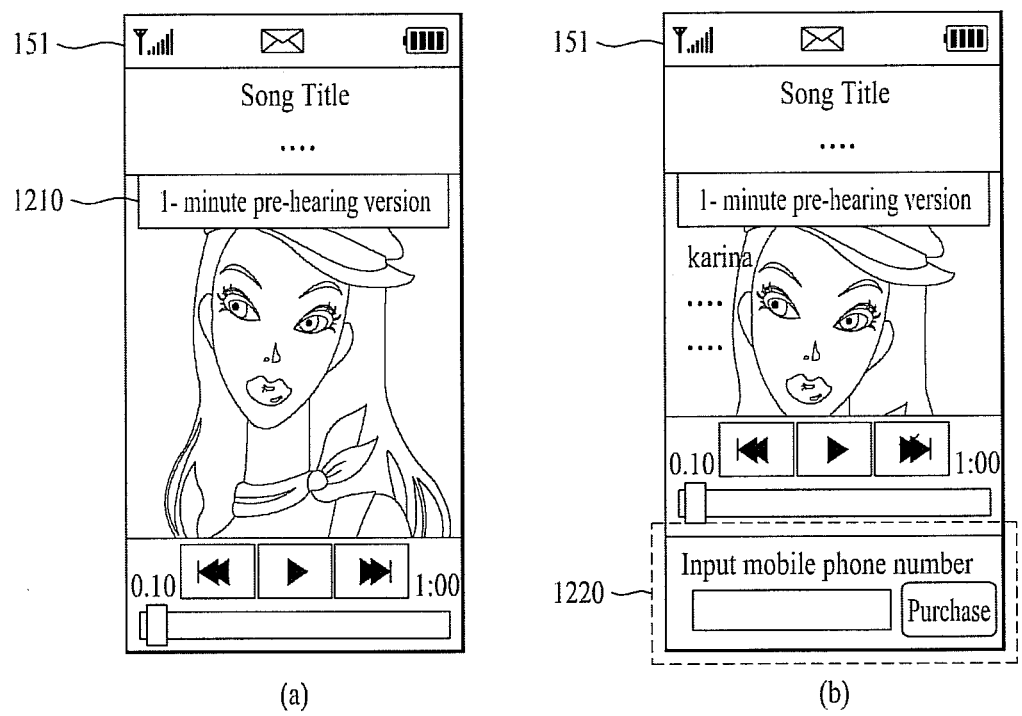
FIG. 12 is a diagram for one example of a process for transmitting information related to a multimedia content via NFC contact by stages in a mobile terminal according to one embodiment of the present invention.

FIG. 12 is a diagram for one example of a process for transmitting information related to a multimedia content via NFC contact by stages in a mobile terminal according to one embodiment of the present invention.

FIG. 12 shows one example of a following process. First of all, the mobile terminal 100 comes in NFC contact with an external NFC device retaining such a multimedia content as a music related information. Secondly, a pre-hearing procedure and a purchase procedure are performed by stages.

Referring to FIG. 12, when an initial NFC contact occurs, a music file or streaming data is delivered to the mobile terminal 100 to enable to play a specific music for a predetermined period of time. Hence, referring to FIG. 12 (a), a music play application is displayed on the display unit 151 of the mobile terminal 100 and the corresponding music is played. In doing so, an album jacket image and the like may be displayed together with the music play application in accordance with the data transmitted from the external NFC device. And, a text 1210 indicating a pre-hearing version may be displayed. If a $2^{nd}$ NFC contact occurs, a purchase related information of the corresponding music is received and a function 1220 for performing a purchase procedure may be then displayed [FIG. 12 (b)].

Meanwhile, while exhibits are arranged like a gallery, an exposition or the like, if the mobile terminal 100 comes in NFC contact with such an external NFC device as a kiosk situated in front of each of the exhibits by storing information on the corresponding exhibit, information on the corresponding exhibit may be transmitted to the mobile terminal 100 by stages. This is described with reference to FIG. 13 as follows.

Figure 13:
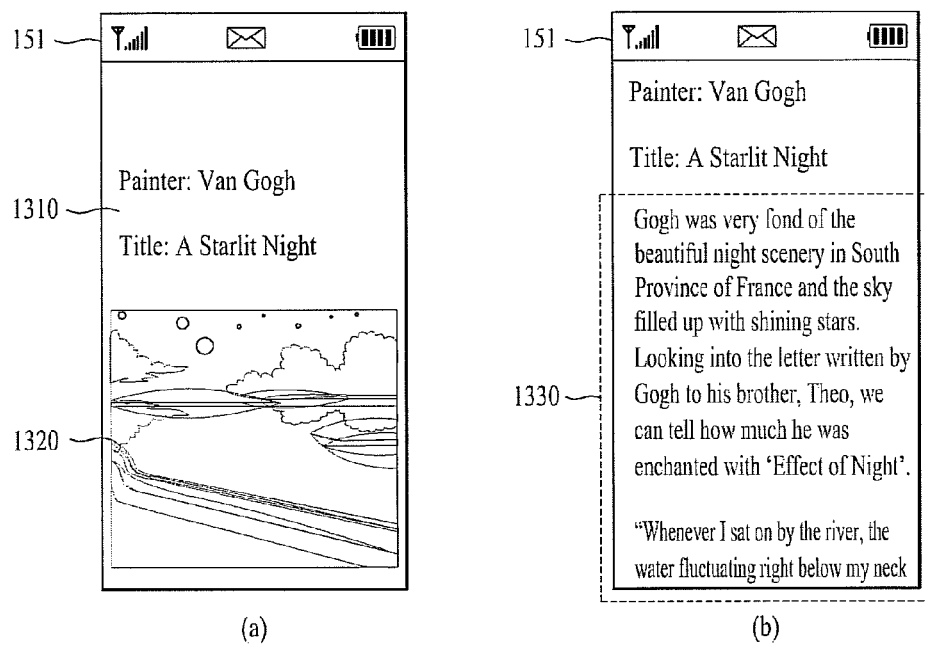
FIG. 13 is a diagram for one example of a process for transmitting exhibit related information via NFC contact by stages in a mobile terminal according to one embodiment of the present invention.

FIG. 13 is a diagram for one example of a process for transmitting exhibit related information via NFC contact by stages in a mobile terminal according to one embodiment of the present invention.

In FIG. 13, assume a case that information on a picture in a gallery is transmitted by stages to the mobile terminal through NFC contact.

Referring to FIG. 13 (a), If an initial NFC contact with an external NFC device occurs, a painter/title information 1310 of a specific picture and an image information 1320 on the specific picture are received as a $1^{st}$ priority information by the mobile terminal 100 and are then displayed on the display unit 151 of the mobile terminal 100. If a $2^{nd}$ NFC contact occurs, a detailed text information 1330 on the corresponding picture is received as a $2^{nd}$ priority information and may be then displayed on the display unit 151 of the mobile terminal 100. Besides, if a $3^{rd}$ NFC contact occurs [not shown in the drawing], a speech narration information on the corresponding picture is received by the mobile terminal 100 and may be then played via the audio output unit 152.

Multi-Step Settlement Via NFC Contact

In the following description, various multi-step settlement methods via NFC contact according to another embodiment of the present invention are explained.

Figure 14:
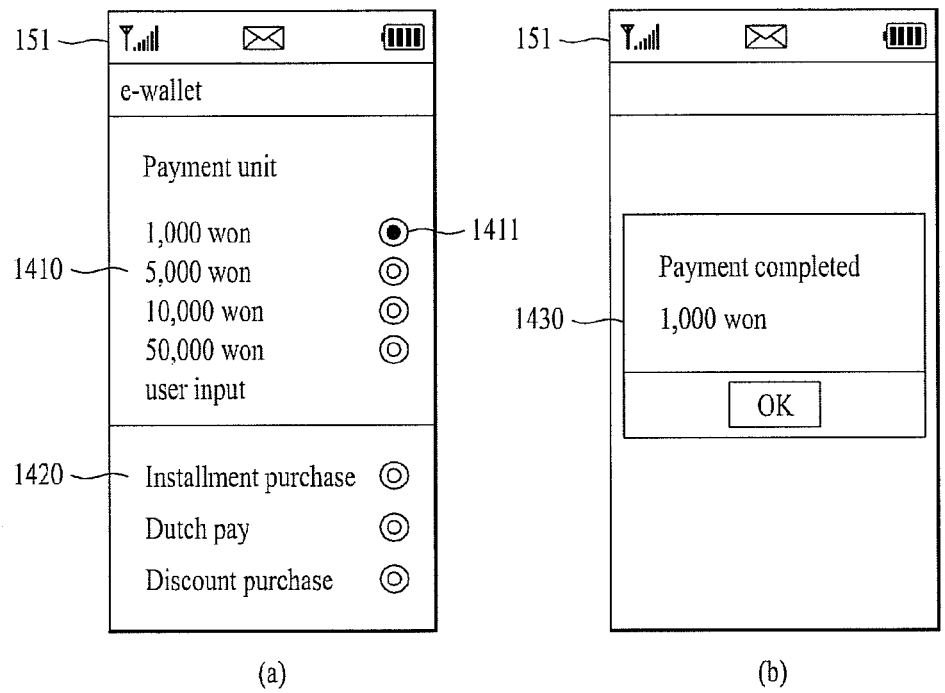
FIG. 14 is a diagram for one example of settling an account via NFC contact in a mobile terminal according to another embodiment of the present invention.
Figure 14:
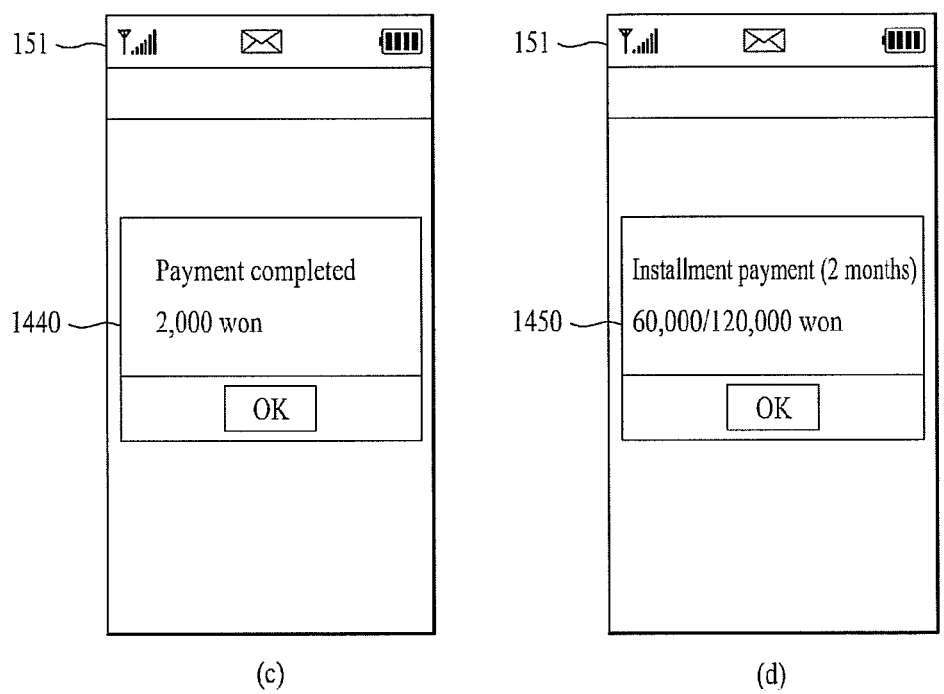

FIG. 14 is a diagram for one example of settling an account via NFC contact in a mobile terminal according to another embodiment of the present invention.

In FIG. 14, assume that an external NFC device may be able to perform a function of settling an account, for which a user of a mobile terminal is billed, using information transmitted by the mobile terminal.

Referring to FIG. 14 (a), as an e-wallet application for performing an electronic settlement via NFC module is activated in the mobile terminal 100, a menus for settlements are displayed on the display unit 151 of the mobile terminal 100. In particular, each of the settlement menus may include a settlement amount selecting menu 1410 and a purchase type selecting menu 1420.

If a user selects '1,000 won' 1411 from the settlement amount selecting menu 1410, 1,000 won may be paid each time an NFC contact with the external NFC device capable of the settlement function occurs. For instance, if an initial NFC contact occurs, referring to FIG. 14 (b), 1,000 won is paid and a popup window 1430 indicating the settlement of 1,000 won may be then displayed on the display unit 151 of the mobile terminal 100. If a $2^{nd}$ NFC contact occurs, referring to FIG. 14 (c), 2,000 won is paid and a popup window 1440 indicating the settlement of 2,000 won may be then displayed on the display unit 151 of the mobile terminal 100. Similarly, in case of paying a public transportation fare, each time an NFC contact with an NFC device of a ticket wicket (e.g., a bus card settlement terminal, etc.) occurs, the payment for one passenger may be additionally performed.

Meanwhile, in case that an installment purchase is selected from the purchase type selecting menu 1420, each time an NFC contact occurs consecutively within a predetermined period of time, the number of installment months may be incremented. For instance, after a user has selected the installment purchase menu for the payment of a product amounting to 120,000 won, if the user generates two consecutive NFC contacts with the external NFC device, referring to FIG. 14 (d), a popup window 1450 indicating two monthly installments may be displayed.

If a dutch pay menu is selected from the purchase type selecting menu 1420, each time an NFC contact occurs consecutively within a predetermined period of time, the number of persons for making the payment may be incremented. For instance, a $1^{st}$ mobile terminal performs 3 consecutive NFC contacts within a predetermined period of time, a payment for equal amounts for 3 persons is made, respectively. In particular, after the $1^{st}$ mobile terminal has made ⅓ of the payment, a $2^{nd}/3^{rd}$ mobile terminal performs a next NFC contact and then makes ⅓ of the payment. Thus, each of the $1^{st}$ to $3^{rd}$ mobile terminals makes ⅓ of the payment.

Moreover, in case that electronic credit cart informations respectively having at least two different discount rates for a corresponding payment target product exist in the mobile terminal, if a discount purchase menu is selected from the purchase type selecting menu 1420, each time NFC contact occurs consecutively within a predetermined period of time, a payment can be made via a credit card in order of a higher discount rate to a lower discount rate, and vice versa. In particular, when an initial NFC contact occurs, the payment is attempted via the credit card of 20% discount rate. If a $2^{nd}$ NFC contact occurs within a predetermined period of time, a payment for the corresponding product may be made via the credit card of 10% discount rate.

Meanwhile, in case that the mobile terminal 100 is provided with a sensor (e.g., a gyro sensor, an acceleration sensor, etc.) capable of sensing a laid direction of the mobile terminal 100, if an NFC contact is performed on an external NFC device having a settlement function while the mobile terminal is held upside down, the corresponding payment may be cancelled. In doing so, if a user selects a payment amount (e.g., 1,000 won 1411 from the selecting menu 1410), the payment by 1,000 won may be cancelled each time an NFC contact occurs, while the mobile terminal is held upside down.

Setting of NFC Transceiving Mode

In the following description, methods of setting an application for activating the aforementioned NFC transceiving mode, a transmission count or a transmission range are explained with reference to FIG. 15 and FIG. 16.

Figure 15:
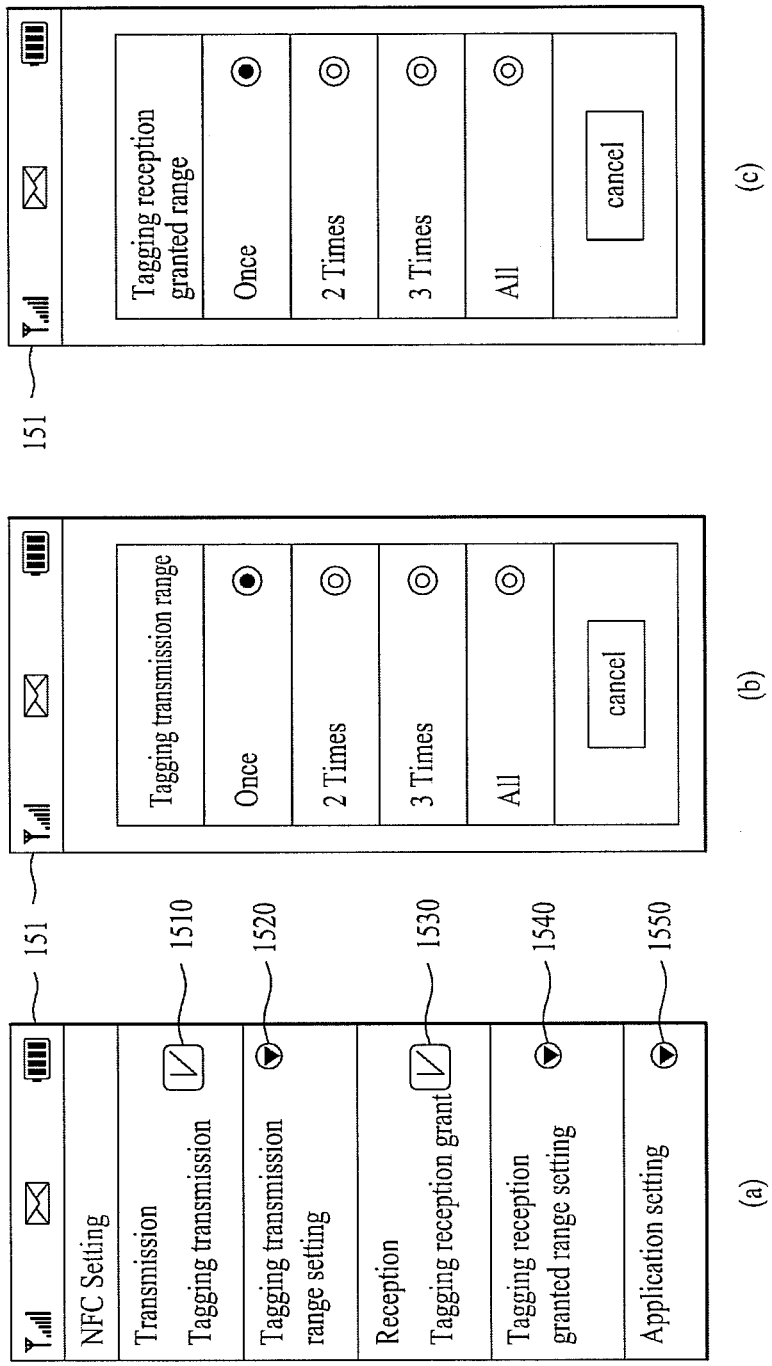
FIG. 15 is a diagram for one example of a method for setting an NFC transceiving mode in a mobile terminal according to one embodiment of the present invention.

FIG. 15 is a diagram for one example of a method for setting an NFC transceiving mode in a mobile terminal according to one embodiment of the present invention.

Referring to FIG. 15 (a), an NFC setting menu may be displayed on the display unit 151 in response to a prescribed menu manipulation via the user input unit 130 of the mobile terminal 100. In this case, the NFC setting menu may include a transmission function use/non-use setting menu 1510, a transmission range (i.e., grant count) setting menu 1520, a reception function use/non-use setting menu 1530, a reception range setting menu 1540 and an application setting menu 1550.

The transmission function use/non-use setting menu 1510 and the reception function use/non-use setting menu 1530 may mean a function of turning on/off a transmission function via an NFC module and a function of turning on/off a reception function via the NFC module, respectively.

If the transmission range setting menu 1520 is selected, referring to FIG. 15 (b), a menu for enabling a user to determine how many times the transmission via the NFC contact will be granted. Similarly, if the reception range setting menu 1530 is selected, referring to FIG. 15 (c), a menu for enabling a user to determine how many times the reception via the NFC contact will be granted. In FIG. 15, each of the menus is configured in a manner that one of 'once', '2 times', '3 times' and 'all' may be selectable foe example, by which the present invention may be non-limited. Alternatively, it may be apparent to those skilled in the art that the grant count may be sellable in a simple manner or in a manner of more complicated steps.

If the application setting menu 1550 is selected, it may be able to display an application list (not shown in the drawing) for selecting an application to which setup values of the aforementioned setting menus will be applied.

In particular, in the menu configuration shown in FIG. 15, the transmission/reception use/non-use and the grant count may be collectively applied to the applications selected via the application setting menu 1550.

Meanwhile, a range of granting a transmission/reception count or a priority of information to be transmitted/received may be settable per application. This is described with reference to FIG. 16 as follows.

Figure 16:
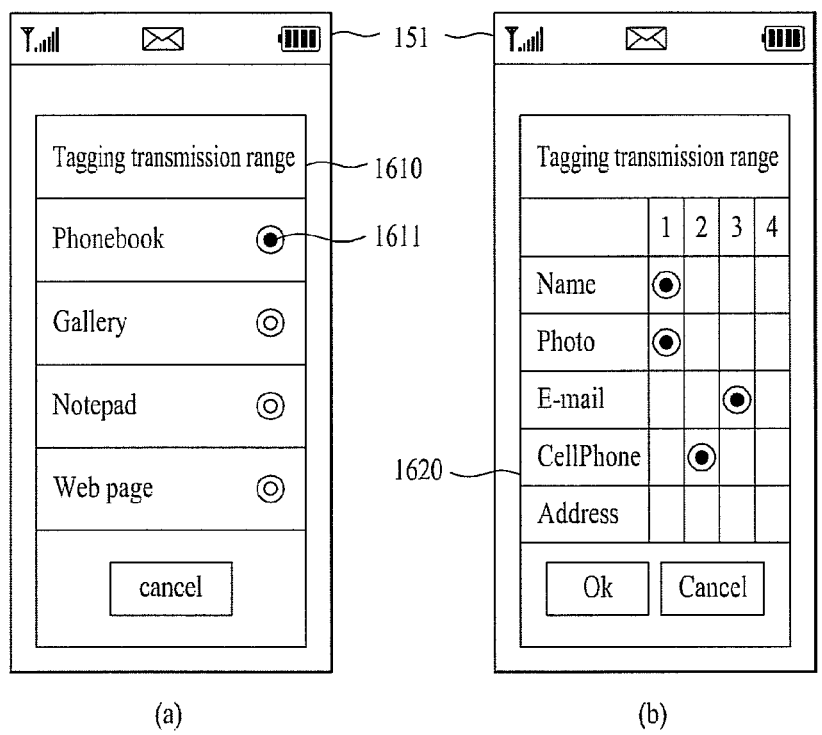
FIG. 16 is a diagram for another example of a method for setting an NFC transceiving mode in a mobile terminal according to one embodiment of the present invention.

FIG. 16 is a diagram for another example of a method for setting an NFC transceiving mode in a mobile terminal according to one embodiment of the present invention.

Referring to FIG. 16 (a), if a transmission range setting menu 1520 is selected, an application list 1610 for per-application setting may be displayed. In doing so, if a user selects a phonebook 1611, a priority setting menu 1620 shown in FIG. 16 (b) may be displayed. Referring to FIG. 16 (b), a $1^{st}$ priority information is set to a name and photo, a $2^{nd}$ priority information is set to a phone number, and a $3^{rd}$ priority information is set to an email address. According to this priority settings, if an NFC transceiving mode is activated via a phonebook application, name and photo information is transmitted to an external NFC device in case of an occurrence of an initial NFC contact. If a $2^{nd}$ NFC contact occurs, a phone number is transmitted. According to the settings shown in FIG. 16 (b), address information may not be transmitted irrespective of an NFC contact count.

Meanwhile, if a transmission range setting menu 1520 is selected, an application list 1660 for per-application settings shown in FIG. 16 (c) may be displayed. Preferably, applications for supporting transmission functions via an NFC module are displayed in the list 1660. A menu 1670 for selecting a maximum granted transmission count per application may be displayed next to a right side of the list 1660. According to the settings shown in FIG. 16 (c), an NFC transceiving mode for a map application is not activated. And, a gallery application grants a once NFC contact only. In particular, if the NFC transceiving mode is activated via the gallery application, the same information may be transmitted to the external NFC device despite occurrences of a plurality of NFC contacts. If the NFC transceiving mode is activated via a webpage application, the webpage information mentioned with reference to FIG. 10 or the history information mentioned with reference to FIG. 11 may be transmitted to the external NFC device 3 times to the maximum by stages. Moreover, if the NFC transceiving mode is activated via a notepad application, as mentioned in the foregoing description with reference to FIG. 8, the controller 180 may control the NFC module to transmit a text of a notepad to be repeatedly transmitted to the external NFC device irrespective of a count each time NFC contact occurs.

By Stages (Step-by-Step) Display of Transmission Information

In the following description, when an NFC transceiving mode is activated, a process for displaying a type or transmission state of information to be transmitted by stages is explained with reference to FIG. 17.

Figure 17:
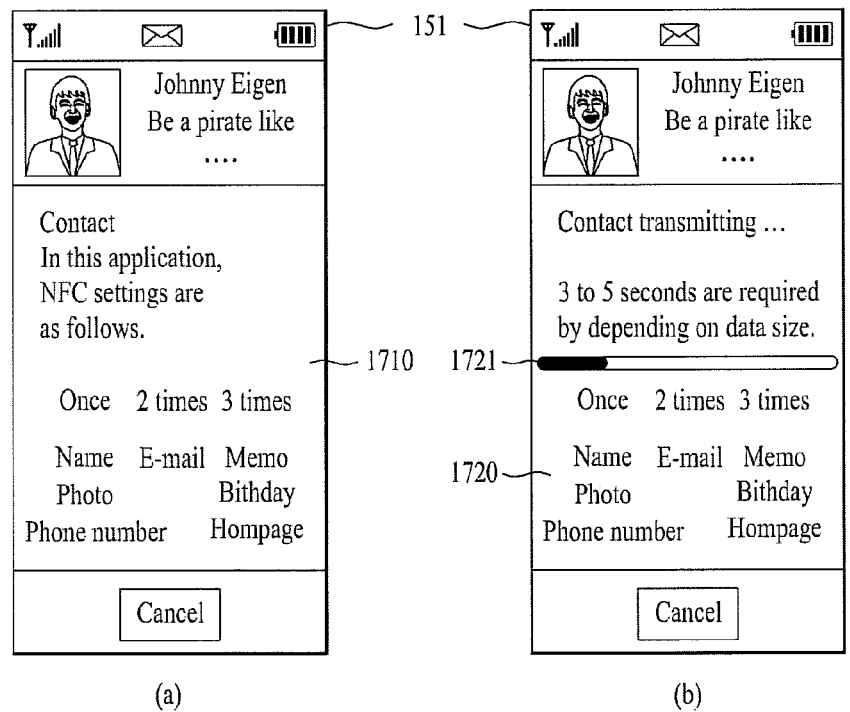
FIG. 17 is a diagram for one example of displaying information transmitted by stages when NFC transceiving mode is activated in a mobile terminal according to one embodiment of the present invention.
Figure 17:
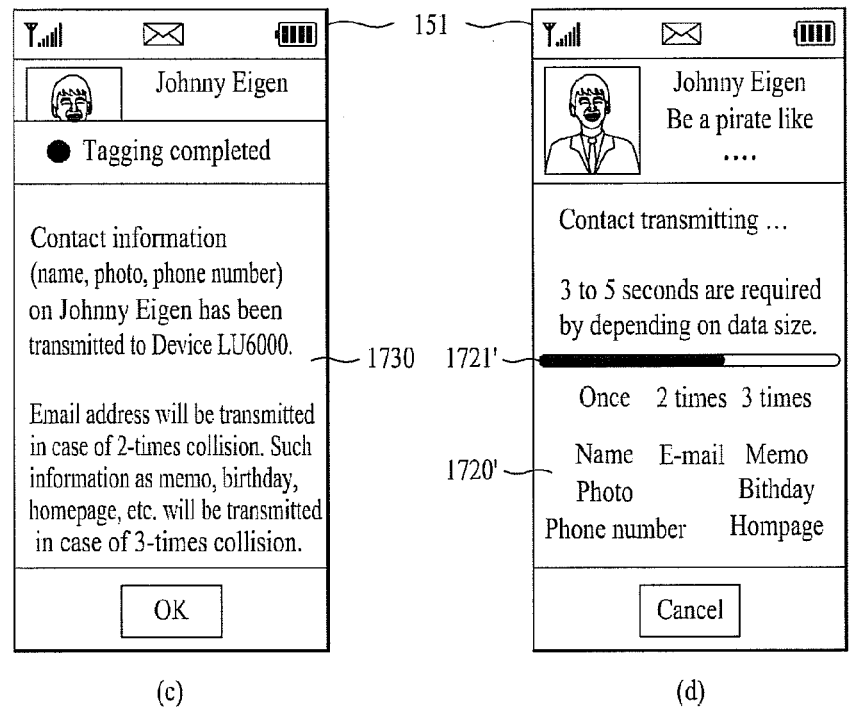

FIG. 17 is a diagram for one example of displaying information transmitted by stages when NFC transceiving mode is activated in a mobile terminal according to one embodiment of the present invention.

Referring to FIG. 17 (a), if a phonebook application is activated in the mobile terminal 100 according to the present invention or an NFC transceiving mode is activated via the phonebook application, a popup window 1710 indicating an NFC setting information may be displayed. On the popup window 1710, a maximum NFC transmission count and a type (e.g., transmission information per priority) of information transmitted for each count may be displayed.

Subsequently, if an initial NFC contact occurs, referring to FIG. 17 (b), a progress bar 1721 indicating a transmission status is displayed while a popup window 1720 is displayed. If the transmission of a $1^{st}$ priority information (e.g., name, photo and phone number) according to the initial NFC contact is completed, referring to FIG. 17 (c), a popup window 1730 containing a transmission state, an external NFC device information and next-priority informations may be displayed. Thereafter, if a $2^{nd}$ NFC contact occurs, referring to FIG. 17 (d), a popup window 1720' containing a progress bar 1721', which indicates that transmissions are performed up to 2 times, may be displayed.

In doing so, a case of an ongoing transmission and a case of transmission completion may be displayed in a manner of differing from each other in color.

Meanwhile, according to the above-mentioned descriptions, in order to prevent malfunction or failure of the NFC contact, the controller 180 an NFC contact to be recognizable only if a specific hardware key button of a virtual key button displayed on the touchscreen is manipulated.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication module to provide wireless communication with another mobile terminal;
a near field communication (NFC) module to perform near field communication (NFC) with an external device; and
a controller to activate an NFC transceiving mode for performing the NFC with the external device, to determine when an NFC connection occurs with the external device and to determine a count of the NFC connection, and the controller to control information to be transmitted by a plurality of stages to the external device via the NFC module based on the determined count of the NFC connection.

2. The mobile terminal of claim 1, wherein the controller determines whether the NFC connection is an initial NFC connection with the external device, wherein when the NFC connection is determined to be the initial NFC connection, the controller controls a first priority information to be transmitted to the external device, and wherein when the NFC connection is determined to not be the initial NFC connection, the controller controls information corresponding to a priority immediately after a last NFC connection to be transmitted to the external device.

3. The mobile terminal of claim 2, wherein when the NFC connection occurs after a predetermined duration from the last NFC connection, the controller determines the NFC connection to be the initial NFC connection.

4. The mobile terminal of claim 2, wherein the controller grants the NFC connection amounting to a predetermined count for a same external device.

5. The mobile terminal of claim 4, wherein the predetermined count is set based on an application of the mobile terminal.

6. The mobile terminal of claim 2, wherein the controller activates the NFC transceiving mode based on an application of the mobile terminal.

7. The mobile terminal of claim 6, wherein the NFC transceiving mode is activated on the mobile terminal based on an application that stores information on a plurality of input items, and wherein the controller transmits a first one of the plurality of input items to the external device and subsequently transmits a second one of the plurality of input items to the external device based on the determined count of the NFC connection.

8. The mobile terminal of claim 7, wherein the application that stores the information on the plurality of input items is a phonebook or an address book.

9. The mobile terminal of claim 6, wherein the NFC transceiving mode is activated on the mobile terminal based on an application for playing a multimedia file, and wherein the controller transmits an abbreviated information, an original copy file or a side information of the multimedia file to the external device based on the determined count of the NFC connection.

10. The mobile terminal of claim 9, wherein the abbreviated information includes a file having a play time that is decreased from the original copy file and a thumbnail image, and wherein the side information includes tag information or meta information.

11. The mobile terminal of claim 6, wherein the NFC transceiving mode is activated on the mobile terminal based on a login required application, and wherein the controller transmits login information for login to the external device by differentiating an expiry period of the login information based on the determined count of the NFC connection.

12. The mobile terminal of claim 6, further comprising a display unit,
wherein the NFC transceiving mode is activated on the mobile terminal based on a browser application for reading a plurality of pages, and
wherein the controller transmits history information on a page previous to a current page displayed on the display unit to the external device by stages based on the determined count of the NFC connection.

13. The mobile terminal of claim 12, wherein the browser includes a web browser or a file browser, and wherein the page includes a webpage.

14. A method of a mobile terminal, comprising:
    activating a near field communication (NFC) module to perform near field communication (NFC) with an external device;
    determining an NFC connection of the mobile terminal with the external device;
    determining whether the NFC connection is an initial NFC connection with the external device;
    when the NFC connection is determined to be the initial NFC connection, transmitting a first priority information related to an NFC transceiving mode to the external device; and
    when the NFC connection is determined to not be the initial NFC connection, transmitting, to the external device, information corresponding to a priority of the NFC transceiving mode immediately after a last NFC connection to the external device.

15. The method of claim 14, further comprising when an NFC connection occurs after a predetermined duration from a last NFC connection, the NFC connection is determined to be the initial NFC connection.

16. The method of claim 14, wherein activating the NFC module includes activating the NFC transceiving mode based on an application of the mobile terminal.

17. The method of claim 16, wherein the NFC transceiving mode is activated on the mobile terminal based on an application that stores information on a plurality of input items, and wherein transmitting the first priority information includes transmitting a first one of the plurality of input items to the external device and subsequently transmitting the second one of the plurality of input items to the external device.

18. A method of a mobile terminal, comprising:
    activating a near field communication (NFC) transceiving mode of the mobile terminal;
    determining a first NFC connection of the mobile terminal with an external device;
    transmitting a first priority information related to the NFC transceiving mode to the external device in response to determining the first NFC connection;
    determining a second NFC connection of the mobile terminal with the external device; and
    transmitting a second priority information related to the NFC transceiving mode to the external device in response to determining the second NFC connection.

19. The method of claim 18, further comprising when an NFC connection occurs after a predetermined duration from a last NFC connection of the NFC transceiving mode, the NFC connection is determined to be the initial NFC connection.

20. The method of claim 18, wherein the NFC transceiving mode is activated on the mobile terminal based on an application that stores information on a plurality of input items, and wherein transmitting the first priority information includes transmitting a first one of the plurality of input items to the external device and subsequently transmitting the second one of the plurality of input items to the external device.

* * * * *